United States Patent
Nagashima (10) Patent No.: US 10,826,394 B2
(45) Date of Patent: Nov. 3, 2020

(54) INTEGRATED CIRCUIT AND MOTOR DEVICE

(71) Applicant: Asahi Kasei Microdevices Corporation, Tokyo (JP)

(72) Inventor: Tamotsu Nagashima, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 16/522,612

(22) Filed: Jul. 25, 2019

(65) Prior Publication Data

US 2020/0036289 A1    Jan. 30, 2020

(30) Foreign Application Priority Data

Jul. 27, 2018 (JP) ................. 2018-141771

(51) Int. Cl.
*H03M 1/12* (2006.01)
*H02M 3/158* (2006.01)
(Continued)

(52) U.S. Cl.
CPC ........... *H02M 3/158* (2013.01); *H02M 1/088* (2013.01); *H02P 27/08* (2013.01); *H02P 2201/11* (2013.01)

(58) Field of Classification Search
CPC ......... H02M 1/088; H02M 2001/0009; H02M 2001/008; H02M 3/158; H02P 2201/11; H02P 27/08
See application file for complete search history.

(56) References Cited

U.S. PATENT DOCUMENTS 3,902,106 A * 8/1975 Kearns ................ B60S 1/483
318/443
4,678,973 A * 7/1987 Elliott .................. H02P 6/22
318/272
(Continued)

FOREIGN PATENT DOCUMENTS

JP      2006081283      3/2006

OTHER PUBLICATIONS

Masayasu Ezaki, et al., "Chapter 5 Vector Control Theory for Brushless DC Motor That Exerts the Force Exerted by the Current on the Rotor as the Maximum Rotational Torque", Vector Control Technology for Brushless DC Motor, Second Edition, Aug. 2013, pp. 71-86, with English translation thereof.

(Continued)

*Primary Examiner* — Muhammad S Islam
(74) *Attorney, Agent, or Firm* — JCIPRNET (57) ABSTRACT

An integrated circuit is provided, including an AD converter; a DC-DC converter converting a received first voltage into a second voltage and providing the second voltage as a power supply voltage of the AD converter; a control part controlling the AD converter and the DC-DC converter. The DC-DC converter includes a first switching element; a second switching element having one end coupled to a reference potential and the other end coupled to one end of the first switching element; a coil coupled to a connection point of the two switching elements; and a current detection part detecting a current flowing to the coil. The control part turns off the first switching element and turns on the second switching element, and after the current detected by the current detection part becomes equal to or smaller than a reference current value, turn off the second switching element to operate the AD converter.

11 Claims, 6 Drawing Sheets

(51) Int. Cl.
*H02M 1/088* (2006.01)
*H02P 27/08* (2006.01)

(56) References Cited

U.S. PATENT DOCUMENTS

| | | | |
|---|---|---|---|
| 5,703,447 A | 12/1997 | Higuchi | |
| 2010/0019697 A1* | 1/2010 | Korsunsky | H05B 45/10 315/307 |
| 2014/0002047 A1* | 1/2014 | Houston | H02M 3/156 323/283 |
| 2016/0344403 A1 | 11/2016 | Sonnaillon | |

OTHER PUBLICATIONS

Takashi Kenjo, "Chapter 3 Brushless Motor", Basics of Miniature Motor and Microcomputer Control, Ninth Edition, Mar. 1993, pp. 77-95, with English translation thereof.

Kazuo Nagatake, "2-2 Brushless DC motor", Motor/Inverter Technology for Home Appliances, First Edition, Apr. 2000, pp. 33-61, with English translation thereof.

* cited by examiner

INTEGRATED CIRCUIT AND MOTOR DEVICE

CROSS REFERENCE TO RELATED APPLICATIONS

This application claims the priority benefit of Japanese Patent Application No. 2018-141771, filed on Jul. 27, 2018. The entirety of the above-mentioned patent application is hereby incorporated by reference herein and made a part of this specification.

BACKGROUND

Technical Field

The disclosure relates to an integrated circuit and a motor device.

Description of Related Art

A motor is known, which detects the rotational position of the rotor with an encoder or the like, controls the current flowing to the motor coil by an IC using a transistor according to the rotational position, and drives the rotor to rotate. For example, Patent Document 1 (Japanese Laid-Open No. 2006-81283), Non-Patent Document 1 (Masayasu Ezaki, "Vector Control Technology for Brushless DC Motor", Second Edition, Aug. 1, 2013), Non-Patent Document 2 (Takashi Kenjo, "Basics of Miniature Motor and Microcomputer Control", Ninth Edition, Mar. 25, 1993) and Non-Patent Document 3 (Kazuo Nagatake, "Motor/Inverter Technology for Home Appliances", First Edition, Apr. 28, 2000) can be referred to.

In order to control the rotation of the motor, an AD converter that measures the current flowing to the motor coil is used. It is preferable that the AD converter can operate with high precision to control the motor with high precision.

SUMMARY

In view of the above, according to the first aspect of the disclosure, an integrated circuit is provided, which includes: an AD converter converting an analog signal into a digital signal; a DC-DC converter converting a first voltage that is received into a second voltage to provide the second voltage as a power supply voltage of the AD converter; and a control part controlling the AD converter and the DC-DC converter, wherein the DC-DC converter includes: a first switching element; a second switching element having one end coupled to a reference potential and the other end coupled to one end of the first switching element; a coil coupled to a connection point of the first switching element and the second switching element; and a current detection part detecting a current flowing to the coil, wherein the control part sets the first switching element to an off state and sets the second switching element to an on state, and after the current detected by the current detection part becomes equal to or smaller than a reference current value, sets the second switching element to the off state to operate the AD converter.

According to the second aspect of the disclosure, a motor device is provided, which includes: the integrated circuit according to the first aspect; and a motor driven by a drive circuit.

Nevertheless, the summary of the disclosure above does not list all the essential features of the disclosure. In addition, a subcombination of these feature groups may also be a disclosure of the application.

DESCRIPTION OF THE EMBODIMENTS

Hereinafter, the disclosure will be described with reference to the following embodiments, but they are not intended to limit the disclosure according to the claims. In addition, not all combinations of the features described in the embodiments are essential to the solution of the disclosure.

Figure 1:
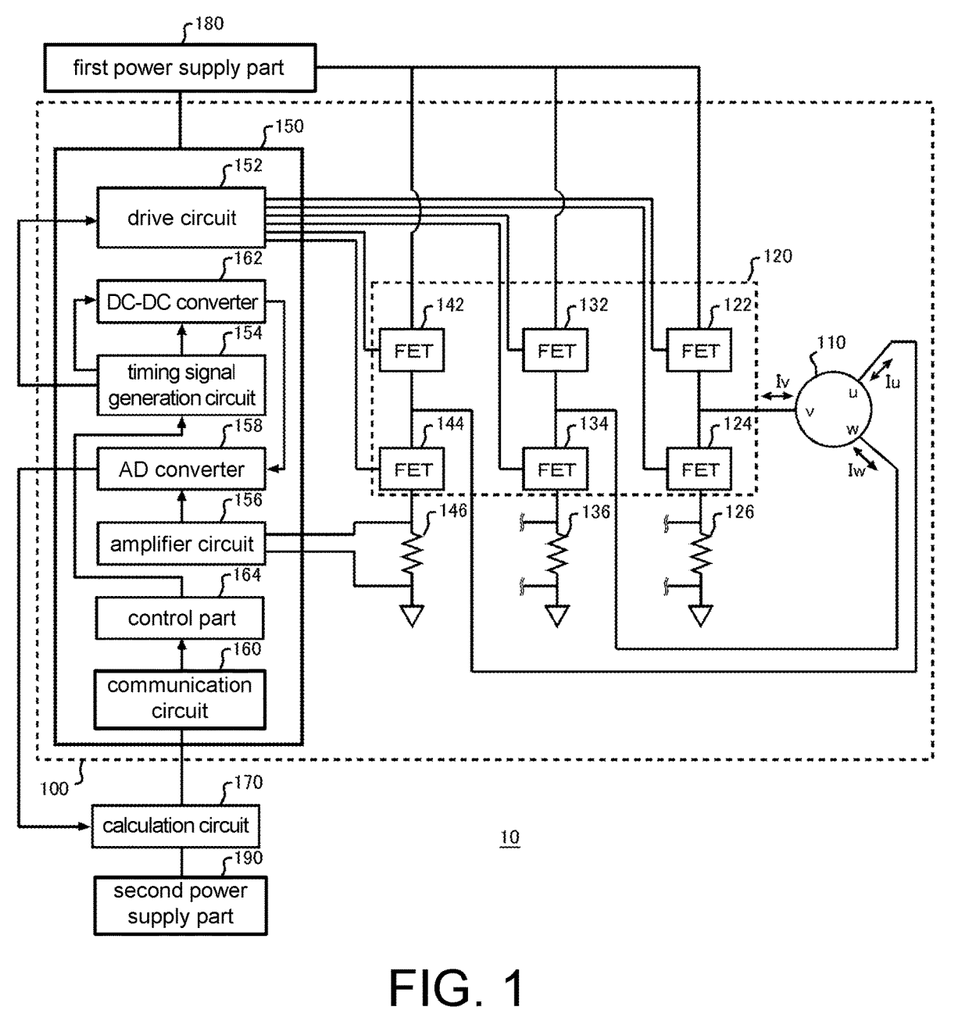
FIG. 1 is a block diagram schematically showing the motor device 10 according to an embodiment of the disclosure.

FIG. 1 is a block diagram schematically showing a motor device 10 according to an embodiment of the disclosure. The motor device 10 includes a motor module 100 that includes a motor 110. The motor device 10 in this example further includes a calculation circuit 170, a first power supply part 180, and a second power supply part 190. Although the motor device 10 shown in FIG. 1 includes one motor module 100, the motor device 10 may include a plurality of motor modules 100.

The motor module 100 in this example includes the motor 110, a switching element group 120, a detection part 126, a detection part 136, a detection part 146, and an integrated circuit 150. The motor 110 may be a brushless motor. In the example of FIG. 1, the motor 110 is a three-phase brushless motor. In FIG. 1, the phases of the motor 110 are indicated by u, v, and w. The circuit of each phase of the motor 110 receives the power from the first power supply part 180 via the switching element group 120. The rotor of the motor 110 is rotated by the magnetic field generated by the circuit of each phase of the motor 110.

The switching element group 120 includes a plurality of switching elements and controls the current flowing to each phase of the motor 110. The switching element group 120 in this example includes a switching element 122 and a switching element 124 that control the current flowing to the phase v of the motor 110, a switching element 132 and a switching element 134 that control the current flowing to the phase w of the motor 110, and a switching element 142 and a switching element 144 that control the current flowing to the phase u of the motor 110.

The switching elements 122 to 144 included in the switching element group 120 may be field effect transistors (FET). For example, the switching elements 122 to 144 may be PMOS or NMOS. In addition, the switching elements that control the current for each phase may be disposed complementarily.

As an example, the switching element 122 may be a PMOS and the switching element 124 may be NMOS. The switching elements 132 and 134 and the switching elements 142 and 144 may have the same configuration.

At least a part of the switching elements of the switching element group 120 may adopt another configuration instead of FET. For example, the switching elements 122 to 144 may be bipolar transistors, FET, IGBT, or thyristors.

The detection part 126, the detection part 136, and the detection part 146 (may be referred to as "detection part 136 and the like" collectively) are disposed between the switching element group 120 and the ground, and each detect the current flowing to one phase of the motor 110. For example, the detection part 136 is disposed between the switching element 134, which is disposed on the low potential side with respect to the switching element 132, and the ground, and detects the current flowing to the phase w.

The detection part 136 and the like may include a shunt resistor, and terminals coupled by wiring to the integrated circuit 150 at two ends of the shunt resistor. Thereby, the detection part 136 and the like transmits the potential difference between two ends of the shunt resistor to the integrated circuit 150 as current amount information of the current flowing to each phase of the motor 110. The shunt resistor may be a resistor of several tens of milliohms, for example.

In the present embodiment, the detection part 136 detects the current Iw flowing to the phase w of the motor 110, and the detection part 146 detects the current Iu flowing to the phase u of the motor 110. Since the sum of the currents flowing to the phase v, the phase w, and the phase u of the motor 110 is 0, the current Iv flowing to the phase v of the motor 110 can be calculated from −(Iw+Iu). Therefore, it is possible to omit the detection part corresponding to the phase v from the motor module 100 and reduce the system cost. Alternatively, the motor module 100 may be provided with the detection part 126 corresponding to the phase v to realize more precise motor control.

The integrated circuit 150 monitors the current amount of the motor 110 and controls the driving of the motor 110 via the switching element group 120. For example, the integrated circuit 150 notifies the calculation circuit 170 of the current amount information of the current flowing to each phase of the motor 110 acquired from the detection part 136 and the like. The calculation circuit 170 generates a voltage or signal for controlling the switching element group 120 based on the current amount information. The integrated circuit 150 controls the switching operation of the switching element group 120 based on the voltage or signal generated by the calculation circuit 170 to control the driving of the motor 110.

The integrated circuit 150 is an IC obtained by integrating circuits that realize multiple functions for performing different processes. The integrated circuit 150 includes an AD converter 158, a DC-DC converter 162, and a control part 164. The AD converter 158 converts a received analog signal into a digital signal. The AD converter 158 in this example converts the current amount information of the current flowing to each phase of the motor 110 into a digital signal. The AD converter 158 in this example transmits the current amount information converted into a digital signal to the calculation circuit 170. The AD converter 158 may be realized by any known circuit.

The DC-DC converter 162 converts a received first voltage into a second voltage and generates the second voltage as the power supply voltage of the AD converter 158. The DC-DC converter 162 in this example converts the first voltage received from the first power supply part 180 into the second voltage smaller than the first voltage. In the integrated circuit 150, the DC-DC converter 162 may also supply the power supply voltage to circuits other than the AD converter 158. The DC-DC converter 162 may further generate the power supply voltage for the calculation circuit 170. The DC-DC converter 162 may generate a plurality of voltages based on the first voltage. The DC-DC converter 162 may supply each circuit of the integrated circuit 150 with a voltage different from those of other circuits or with a voltage the same as those of other circuits.

The control part 164 controls the AD converter 158 and the DC-DC converter 162. The control part 164 may further control each circuit, other than the AD converter 158 and the DC-DC converter 162, in the integrated circuit 150. In FIG. 1, the control part 164 is shown as a component different from the circuits such as the AD converter 158 and the DC-DC converter 162, but a part or all of the control part 164 may be included in the AD converter 158 or the DC-DC converter 162 or may be included in a plurality of circuits separately. The control part 164 may control at least a part of the circuits of the integrated circuit 150 based on the voltage or the like generated by the calculation circuit 170.

The control part 164 operates the AD converter 158 when a voltage conversion operation of the DC-DC converter 162 stops. The voltage conversion operation of the DC-DC converter 162 refers to an operation for converting the first voltage into the second voltage. As an example, the DC-DC converter 162 includes a switching regulator that converts the first voltage into the second voltage by a switching operation. In this case, the switching operation corresponds to the voltage conversion operation. Hereinafter, as the switching operation is equivalent to the voltage conversion operation in this example.

The AD converter 158 operates when the switching operation of the DC-DC converter 162 stops, which makes it possible to suppress the influence of noise generated by the switching operation of the DC-DC converter 162 to improve the analog/digital conversion precision of the AD converter 158. Further, as the precision of the AD converter 158 is improved, the driving precision of the motor 110 can be improved.

The integrated circuit 150 is configured such that the AD converter 158 can operate even when the switching operation of the DC-DC converter 162 stops. For example, the DC-DC converter 162 may have a configuration that can apply the power supply voltage to the AD converter 158 for a predetermined period even when the switching operation stops. The DC-DC converter 162 may have a capacitor that accumulates charge during the switching operation and generates a voltage to the AD converter 158.

In another example, the AD converter 158 may have a configuration that can operate for a predetermined period even when the voltage applied from the DC-DC converter 162 stops. For example, the AD converter 158 may have a capacitor that accumulates charge when receiving power supply from the DC-DC converter 162 and functions as a power supply when no power is supplied from the DC-DC converter 162.

In another example, the integrated circuit 150 may have a power storage part. The power storage part may accumulate charge by the DC-DC converter 162 when the DC-DC converter 162 performs the switching operation, and supply power to the AD converter 158 when the DC-DC converter 162 does not perform the switching operation.

The integrated circuit 150 may have an amplifier circuit 156. The amplifier circuit 156 amplifies the detection value (in this example, the voltage across the shunt resistor of the detection part 136 and the like) of the current detected by the detection part 136 and the like. The amplifier circuit 156 provides the amplified voltage to the AD converter 158. The amplifier circuit 156 may be realized by any known analog amplifier circuit.

The integrated circuit 150 may have a drive circuit 152. The drive circuit 152 drives the motor 110 by controlling the switching element group 120. The drive circuit 152 may be supplied with the power supply voltage from the DC-DC converter 162.

The drive circuit 152 may be a predriver that controls the switching operations of the switching elements 122 to 144. For example, the drive circuit 152 receives a drive signal from a timing signal generation circuit 154 and performs ON-OFF switching of each switching element according to the drive signal. In this case, the gates of the switching elements 122 to 144 are coupled to the drive circuit 152.

The drive circuit 152 may receive a plurality of drive signals corresponding to the switching elements 122 to 144 and thereby perform switching controls for each of the switching elements. For example, as shown, the drive circuit 152 may be coupled to the gates of the six switching elements 122 to 144 of the switching element group 120 and perform the driving of the six switching elements 122 to 144 according to the plurality of drive signals received from the timing signal generation circuit 154.

The drive circuit 152 may receive three-phase drive signals from the timing signal generation circuit 154 corresponding to the six switching elements 122 to 144. For example, the drive circuit 152 may receive the drive signal of the phase v corresponding to the switching elements 122 and 124, receive the drive signal of the phase w corresponding to the switching elements 132 and 134, and receive the drive signal of the phase u corresponding to the switching elements 142 and 144.

The drive circuit 152 may control the timing of switching of each switching element according to the drive signal. For example, the drive circuit 152 may turn on the switching element 122 and turn off the switching element 124 in response to reception of a drive signal at + level for the phase v. The drive circuit 152 may turn off the switching element 122 and the switching element 124 in response to reception of a drive signal at 0 level for the phase v. The drive circuit 152 may turn off the switching element 122 and turn on the switching element 124 in response to reception of a drive signal at—level for the phase v. The drive circuit 152 may perform the same operation for the phase u and the phase w.

The timing signal generation circuit 154 receives a drive voltage value from the calculation circuit 170, generates a drive signal according to the drive voltage value, and provides the drive signal to the drive circuit 152. For example, the timing signal generation circuit 154 generates a pulse width modulation (PWM) signal having a pulse width corresponding to the drive voltage value as the drive signal and controls the operation timing of the drive circuit 152 by the PWM signal. As an example, the timing signal generation circuit 154 receives a three-phase drive voltage value from the calculation circuit 170, generates a three-phase PWM signal corresponding to the three-phase drive voltage value, and provides the three-phase PWM signal to the drive circuit 152.

The timing signal generation circuit 154 may be a circuit that generates a PWM signal corresponding to a numerical value designated by a digital signal. For example, the timing signal generation circuit 154 may be a multi-timing unit (MTU) in which a plurality of counter groups is disposed. The timing signal generation circuit 154 may be realized by other known circuits.

A communication circuit 160 is an interface for performing communication between the integrated circuit 150 and the calculation circuit 170. For example, the motor device 10 may be provided with a serial bus that couples the calculation circuit 170 and the integrated circuit 150. In this case, the communication circuit 160 may be a serial interface circuit for communicating with the calculation circuit 170. Thereby, the communication circuit 160 transmits the output of the AD converter 158 (that is, the current value of each phase of the motor 110) to the calculation circuit 170 and supplies the drive voltage value of each phase received from the calculation circuit 170 to the timing signal generation circuit 154.

The integrated circuit 150 is a semiconductor chip in which the AD converter 158, the DC-DC converter 162, and the control part 164 are integrated on one semiconductor substrate. Nevertheless, regarding at least one component among the AD converter 158, the DC-DC converter 162, and the control part 164, a part of the circuit elements may be provided outside the integrated circuit 150. In the integrated circuit 150 in this example, at least a driver circuit for performing the switching operation in the DC-DC converter 162 and a conversion circuit for converting an analog signal into a digital signal in the AD converter 158 are provided.

The integrated circuit 150 may integrate only a part of the drive circuit 152, the timing signal generation circuit 154, the amplifier circuit 156, the AD converter 158, the communication circuit 160, the DC-DC converter 162, and the control part 164, or may integrate all of them. Other circuits may be further integrated in the integrated circuit 150.

The calculation circuit 170 determines the drive voltage value based on the detected value of the current detected by the detection part 136 and the like. For example, the calculation circuit 170 receives the current value of each phase at the same time of the motor 110 from the AD converter 158 of the integrated circuit 150 and calculates the drive voltage value based on the current value. The calculation circuit 170 may be a microcontroller unit (MCU) that includes a computing circuit capable of performing such calculation.

The calculation circuit 170 may estimate the current rotational position of the rotor of the motor 110 based on the current value of each phase and determine the drive voltage value to be provided to the timing signal generation circuit 154 based on at least one of the current rotational position and the current value of each phase. The calculation circuit 170 may generate a PWM duty as the drive voltage value and provide the PWM duty to the timing signal generation circuit 154 that performs PWM. The calculation circuit 170 may determine the drive voltage value based on square wave driving or vector control.

The first power supply part 180 supplies the first voltage to the motor module 100. For example, the first power supply part 180 supplies the first voltage to operate the integrated circuit 150. In addition, the first power supply part 180 supplies the first voltage to the motor 110 via the switching element group 120.

The second power supply part 190 supplies the power supply voltage to the calculation circuit 170. The second power supply part 190 may be a power supply independent of the first power supply part 180. Alternatively, the second power supply part 190 may receive the first voltage from the first power supply part 180, convert the first voltage into a voltage, and supply the voltage to the calculation circuit 170 as the power supply voltage.

Figure 2:
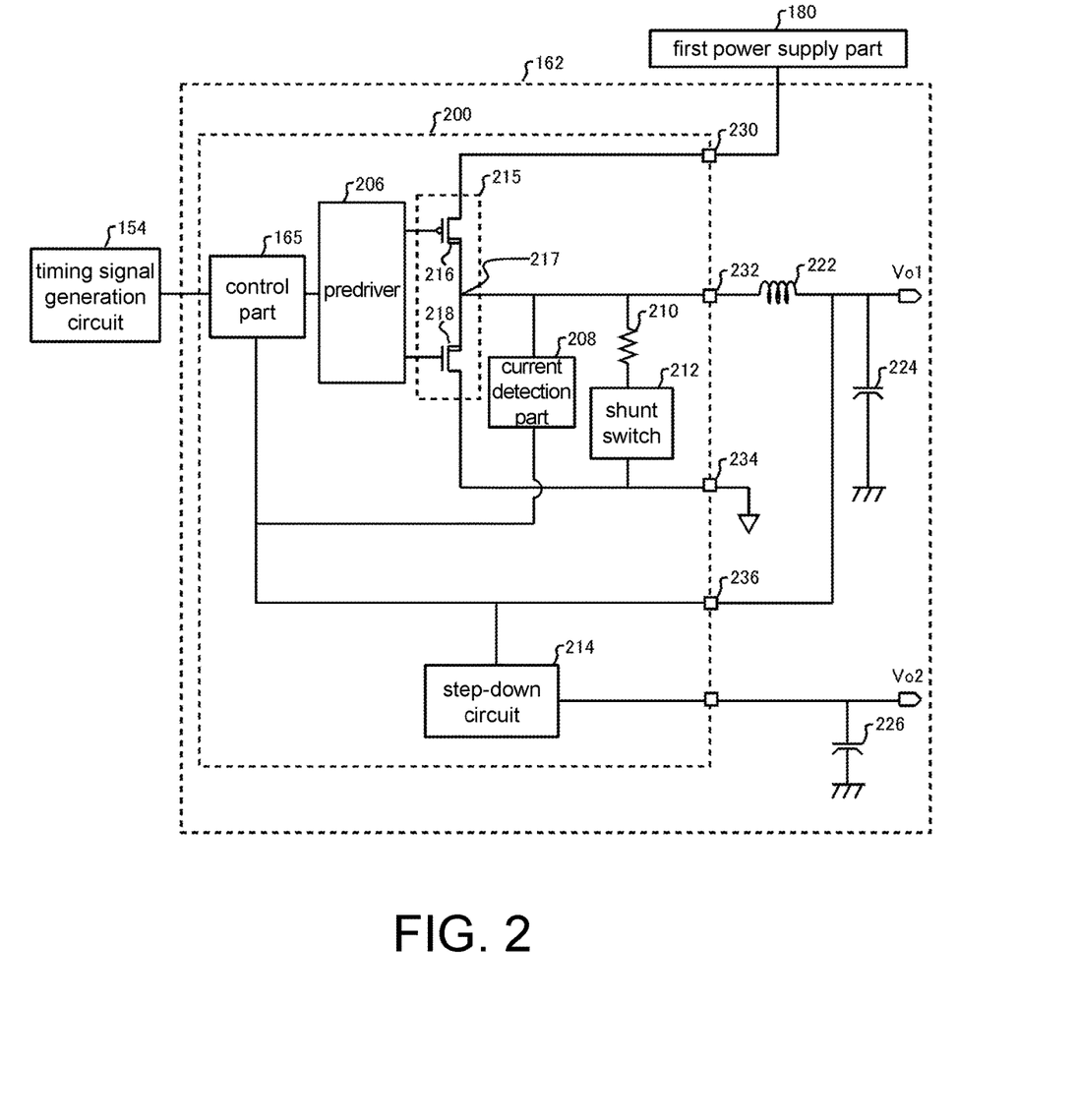
FIG. 2 is a diagram showing an example of the configuration of the DC-DC converter 162.

FIG. 2 is a diagram showing an example of the configuration of the DC-DC converter 162. The DC-DC converter 162 in this example includes an integrated circuit 200, a coil 222, a capacitor 224, and a capacitor 226. The integrated circuit 200 is a part of the integrated circuit 150 shown in FIG. 1.

The integrated circuit 200 in this example has a driver circuit 215, a predriver 206, and a control part 165. The driver circuit 215 in this example includes a switching element 216 and a switching element 218 that perform switching operations complementarily. 216 is an example of the first switching element and 218 is an example of the second switching element. The switching elements 216 and 218 may be PMOS or NMOS. The switching elements 216 and 218 in this example are provided in the integrated circuit 200, but in another example, the switching elements 216 and 218 may be provided outside the integrated circuit 200.

The switching element 216 and the switching element 218 are provided in series between a terminal 230 and a terminal 234, wherein the first voltage from the first power supply part 180 is applied to the terminal 230, and the terminal 234 is coupled to a reference potential such as the ground. The terminals 230 to 236 in FIG. 2 are terminals of the integrated circuit 200. A connection point 217 of the switching element 216 and the switching element 218 functions as an output end of the driver circuit 215. The switching element 216 and the switching element 218 operate complementarily, by which the current output of the driver circuit 215 is adjusted.

The coil 222 and the capacitor 224 are coupled to the connection point 217. In this example, the coil 222 is coupled to the connection point 217 via a terminal 232. Moreover, the capacitor 224 is provided between the coil 222 and a reference potential such as the ground. In the example of FIG. 2, the coil 222 and the capacitor 224 are provided outside the integrated circuit 200, but in another example, the coil 222 and the capacitor 224 may be provided in the integrated circuit 200. The coil 222 and the capacitor 224 smooth the output voltage of the driver circuit 215. The voltage of the capacitor 224 becomes the output voltage Vo1 of the DC-DC converter 162.

The predriver 206 controls the switching element 216 and the switching element 218 of the driver circuit 215. The voltage generated by the driver circuit 215 can be adjusted by adjusting the ratio of the period in which the switching element 216 is turned on and the period in which the switching element 218 is turned on. The predriver 206 takes the duty signal from the control part 165 as input and generates a signal for controlling on/off of the switching elements 216 and 218. The duty signal has two polarities, high state (H state) and low state (L state), and the switching element 216 or 218 corresponding to each polarity shifts to the on state.

The control part 165 adjusts the output voltage Vo1 of the driver circuit 215 by adjusting the duty ratio of the duty signal received by the predriver 206. The output voltage Vo1 may be fed back to the control part 165. The control part 165 may adjust the duty ratio of the duty signal so that the output voltage Vo1 becomes a predetermined voltage. The control part 165 in this example operates according to a timing signal inputted from the timing signal generation circuit 154. As an example, the timing signal is a signal having a pulse at a predetermined cycle. The control part 165 may generate a duty signal synchronized with the timing signal.

The control part 165 may further generate a duty signal based on the current flowing to the coil 222. For example, the control part 165 may control the polarity of the duty signal according to the result of comparison between the current value flowing to the coil 222 and a predetermined reference current value.

The integrated circuit 200 in this example has a current detection part 208. The current detection part 208 detects the current value flowing to the coil 222 and transmits the current value to the control part 165. The control part 165 generates a duty signal based on the current value detected by the current detection part 208.

The current detection part 208 may detect the current flowing from the connection point 217 of the driver circuit 215 to the terminal 232 of the integrated circuit 200. The coil 222 is coupled to the terminal 232 in this example. In another example, the current detection part 208 may detect the current flowing to the switching element 216, may detect the current flowing to the switching element 218, or may detect a total current of the current flowing to the switching element 216 and the current flowing to the switching element 218.

The integrated circuit 200 may have a step-down circuit 214. The step-down circuit 214 receives the output voltage Vo1 as the input voltage. The step-down circuit 214 converts the output voltage Vo1 to generate an output voltage Vo2. The DC-DC converter 162 may generate the output voltage Vo1 or Vo2 as the power supply voltage (first voltage) of the AD converter 158. In addition, the DC-DC converter 162 may generate the output voltage Vo1 or Vo2 as the power supply voltage for other circuits in the integrated circuit 150. The integrated circuit 200 may have a plurality of step-down circuits 214. The step-down circuit 214 may be provided for each circuit of the integrated circuit 150. The output voltages of the step-down circuits 214 may be the same or different. Moreover, the integrated circuit 200 may output any output voltage as the power supply voltage of the calculation circuit 170.

The integrated circuit 200 may have a shunt switch 212 and a shunt resistor 210. The shunt switch 212 switches to couple the output end (the connection point 217 in this example) of the driver circuit 215 and the reference potential (the terminal 234 in this example) or not. The shunt switch 212 is an FET for example, but it may be other switch elements. The shunt switch 212 may be controlled by the control part 165. The operation of the shunt switch 212 will be described later.

The shunt resistor 210 is coupled in series with the shunt switch 212. The resistance value of the shunt resistor 210 is 100Ω or more, for example.

Figure 3:
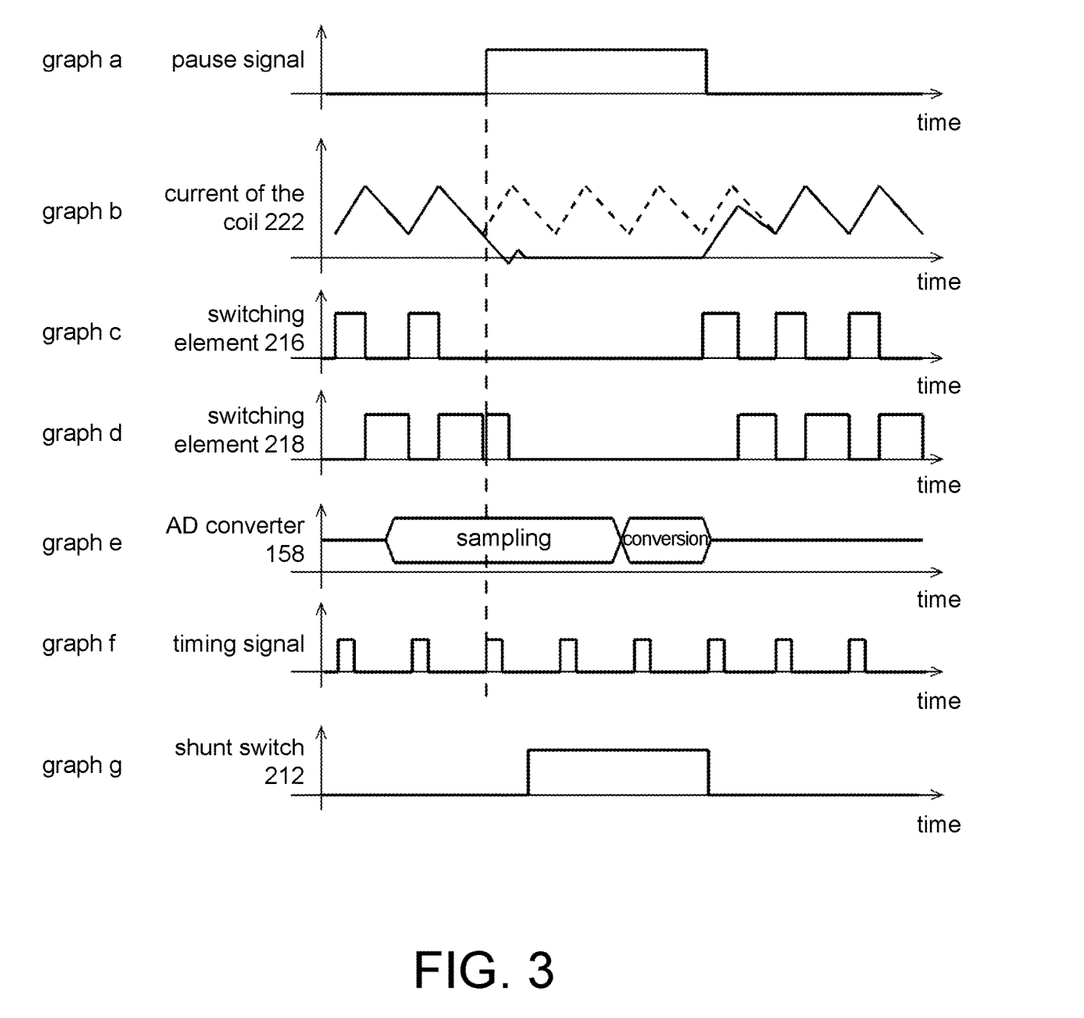
FIG. 3 is a diagram illustrating an example of the operation of the integrated circuit 200 when the AD converter 158 converts an analog signal into a digital signal.

FIG. 3 is a diagram illustrating an example of the operation of the integrated circuit 200 when the AD converter 158 converts an analog signal into a digital signal. The horizontal axis of each graph in FIG. 3 indicates time and the vertical axis indicates the state (level) of the signal, voltage, or current. The graph a shows the pause signal generated by the timing signal generation circuit 154. In this example, the DC-DC converter 162 stops the switching operation in the period in which the pause signal is in the H state (second polarity), and the DC-DC converter 162 performs the switching operation in the period in which the pause signal is in the L state (first polarity). The graph b shows the current flowing to the coil 222. In the graph b, the current corresponding to the pause signal shown in the graph a is indicated by a solid line, and the current when the pause signal remains in the L state is indicated by a broken line.

The graph c shows the operation state of the switching element 216. The graph d shows the operation state of the switching element 218. In the graphs c and d, the switching element is in the on state in the period in which the waveform is in the H state, and the switching element is in the off state in the period in which the waveform is in the L state.

The graph e shows the operation state of the AD converter 158. The AD converter 158 in this example samples the level of the analog signal in the sampling period and generates the digital signal according to the level in the conversion period. The AD converter 158 may hold the level of the sampled analog signal till the conversion period ends.

The graph f shows the timing signal generated by the timing signal generation circuit 154. The timing signal in this example has a pulse at a fixed cycle. The graph g shows the operation state of the shunt switch 212. In the graph g, the shunt switch is in the on state in the period in which the waveform is in the H state, and the shunt switch is in the off state in the period in which the waveform is in the L state.

In the period in which the pause signal is in the L state, the control part 165 generates a duty signal so that the output voltage of the DC-DC converter 162 becomes a predetermined voltage. When the duty signal is in the H state, the switching element 216 is in the on state, and a current is supplied from the first power supply part 180 to the coil 222. In the period, the current of the coil 222 increases as shown in the graph b. In addition, when the duty signal is in the L state, the switching element 218 is in the on state, and a current flows from the capacitor 224 to the reference potential. In the period, the current of the coil 222 decreases as shown in the graph b.

At the timing when the AD converter 158 should operate, the timing signal generation circuit 154 sets the pause signal to the H state. The timing at which the pause signal shifts from the L state to the H state may be before the AD converter 158 starts the sampling operation or may be during the sampling operation.

When the pause signal is in the H state, the control part 165 stops the switching operation in the driver circuit 215. For example, the control part 165 may control both the switching element 216 and the switching element 218 to be in the off state. Thereby, the AD converter 158 can be operated in the state where the noise generated by the switching operation in the driver circuit 215 is suppressed. Nevertheless, the AD converter 158 may receive the power supply voltage from the capacitor 224 or 226 in the state where the switching operation in the driver circuit 215 stops. In this case, the capacitor 224 or the capacitor 226 may have a capacity sufficient to supply the power supply voltage to the AD converter 158 in the period in which the pause signal is in the H state.

However, when both the switching element 216 and the switching element 218 are set to the off state in the state where the coil current is flowing, a regenerative current from the coil 222 may flow through the circuit. When stopping the switching operation of the DC-DC converter 162, the control part 165 in this example sets the first switching element 216 to the off state. The control part 165 sets the second switching element 218 to the off state after the first switching element 216 is in the off state and the current detected by the current detection part 208 becomes equal to or smaller than the reference current value. The control part 165 may keep the second switching element 218 in the on state till the current flowing to the coil 222 becomes equal to or smaller than the reference current value after the pause signal shifts to the H state. As shown in FIG. 3, at the timing when the pause signal shifts to the H state, the control part 165 may keep the second switching element 218 in the on state till the current flowing to the coil 222 becomes equal to or smaller than the reference current value after the second switching element 218 is momentarily set to the off state. The reference current value is 0 amp, for example, but it may be a predetermined current value larger than 0 amp. According to this example, it is possible to stop the switching operation of the DC-DC converter 162 while suppressing the regenerative current from the coil 222.

Further, when stopping the switching operation of the driver circuit 215, the control part 165 in this example controls the shunt switch 212 to be in the on state so as to couple the output end (the connection point 217) of the driver circuit 215 to the reference potential (the terminal 234). The control part 165 sets the shunt switch 212 to the off state in the period in which the driver circuit 215 is performing the switching operation. By setting the shunt switch 212 to the on state, in the period in which both the switching elements 216 and 218 are in the off state, ringing of the voltage at the terminal 232 or the like can be suppressed. In addition, by providing the shunt resistor 210 in series with the shunt switch 212, when the shunt switch 212 is controlled to be in the on state, the current flowing to the shunt switch 212 can be suppressed.

The control part 165 may control the shunt switch 212 to be in the on state after setting both the switching elements 216 and 218 to the off state. However, the timing for setting the shunt switch 212 to the on state is not limited thereto. The control part 165 may control the shunt switch 212 to be in the on state after the current flowing to the coil 222 becomes equal to or smaller than the reference current value. Thereby, the current flowing to the shunt switch 212 can be limited. Therefore, a switching element with a smaller maximum current amount than the switching elements 216 and 218 can be used as the shunt switch 212.

The control part 165 may calculate the operation duty of the driver circuit 215 based on the received signal to control the driver circuit 215. The signal received in this example refers to a signal indicating the voltage value of the output voltage of the DC-DC converter 162. The operation duty refers to information indicating the duty ratio of the duty signal.

When stopping the switching operation of the DC-DC converter 162, the control part 165 may stop the calculation of the operation duty and store the value of the operation duty calculated immediately before the stop. The control part 165 may stop the switching operation of the driver circuit 215 after storing the value of the operation duty. In this case, when resuming the switching operation of the DC-DC converter 162, the control part 165 controls the driver circuit 215 using the value of the operation duty that has been stored. Thereby, when the switching operation of the DC-DC converter 162 is resumed, the DC-DC converter 162 can easily return to the state before the switching operation is stopped.

The control part 165 resumes the switching operation of the DC-DC converter 162 when the pause signal shifts to the L state. The timing signal generation circuit 154 may set the period in which the pause signal maintains the H state to a preset length. The period may have a length sufficient for the AD converter 158 to complete the sampling operation and the conversion operation. In another example, the timing signal generation circuit 154 may shift the pause signal to the L state according to the operation state of the AD converter 158. As an example, the timing signal generation circuit 154 may shift the pause signal to the L state after the AD converter 158 samples the analog signal or may shift the pause signal to the L state after the AD converter 158 generates the digital signal.

Figure 4:
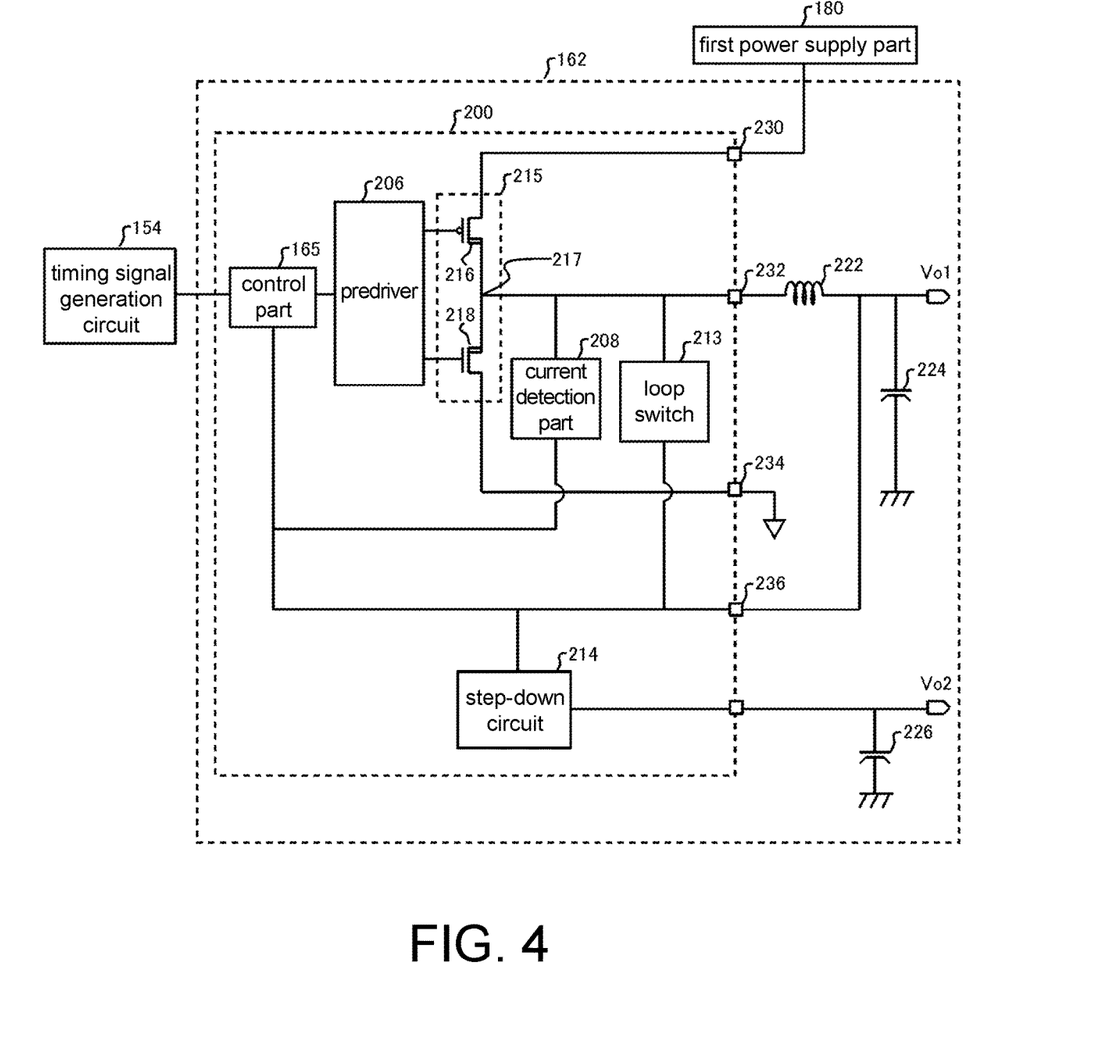
FIG. 4 is a diagram showing another example of the configuration of the DC-DC converter 162.

FIG. 4 is a diagram showing another example of the configuration of the DC-DC converter 162. The DC-DC converter 162 in this example has a loop switch 213 in place of the shunt switch 212 and the shunt resistor 210 in the configuration of the DC-DC converter 162 shown in FIG. 2. The other parts of the configuration are the same as those of the DC-DC converter 162 in any of the forms described with reference to FIG. 1 to FIG. 3.

The loop switch 213 switches to couple two ends of the coil 222 or not. The loop switch 213 is provided in the integrated circuit 200 in the example of FIG. 4, but in another example, the loop switch 213 may be provided outside the integrated circuit 200. The loop switch 213 is an FET for example, but it may be other switching elements. The loop switch 213 in this example switches to couple the terminal 232 and the terminal 236 of the integrated circuit 200 or not. The terminal 232 is coupled to one end of the coil 222, and the terminal 236 is coupled to the other end of the coil 222.

When stopping the switching operation of the DC-DC converter 162, the control part 165 controls the loop switch 213 to be in the on state to couple two ends of the coil 222. The control part 165 may control the loop switch 213 to be in the off state in the period in which the DC-DC converter 162 is performing the switching operation.

Figure 5:
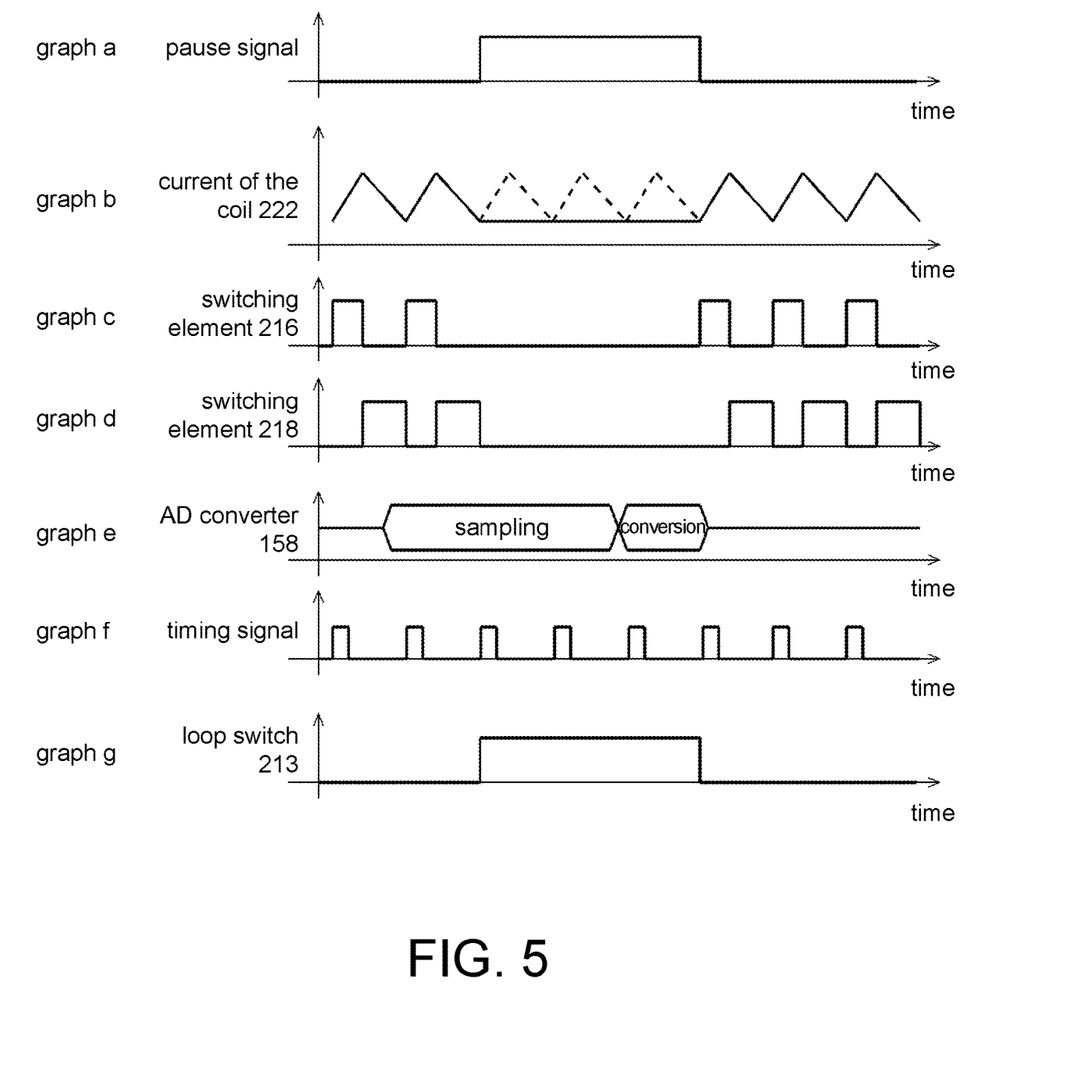
FIG. 5 is a diagram illustrating an example of the operation of the integrated circuit 200 when the DC-DC converter 162 shown in FIG. 4 is used.

FIG. 5 is a diagram illustrating an example of the operation of the integrated circuit 200 when the DC-DC converter 162 shown in FIG. 4 is used. The pause signal, the operation of the AD converter 158, and the timing signal are the same as those in the example shown in FIG. 3. However, the graph h which shows the state of the loop switch 213 is shown in place of the graph g in FIG. 3. A period in which the waveform shown in the graph h is in the H state indicates a period in which the loop switch 213 is in the on state, and a period in which the waveform is in the L state indicates a period in which the loop switch 213 is in the off state.

The control part 165 in this example controls the loop switch 213 to be in the on state when the pause signal shifts to the H state. The control part 165 may set the loop switch 213 to the on state without waiting for the current flowing to the coil 222 to become equal to or smaller than the reference current value. As an example, the control part 165 may control the switching element 218 to be in the off state and control the loop switch 213 to be in the on state at the timing when the pause signal shifts to the H state.

According to this example, the coil current at the time when the switching operation of the driver circuit 215 is stopped circulates in the loop path that includes the loop switch 213 and the coil 222. In an example, the loop path is not provided with a resistor element such as the shunt resistor 210 shown in FIG. 2. Since the coil current circulates in the loop path, the regenerative current can be suppressed from flowing outside the loop path. In addition, the switching operation can be resumed in the state where the coil current at the time when the switching operation of the driver circuit 215 is stopped is maintained. Therefore, when resuming the switching operation, it is possible to easily return to the state immediately before the switching operation is stopped.

Figure 6:
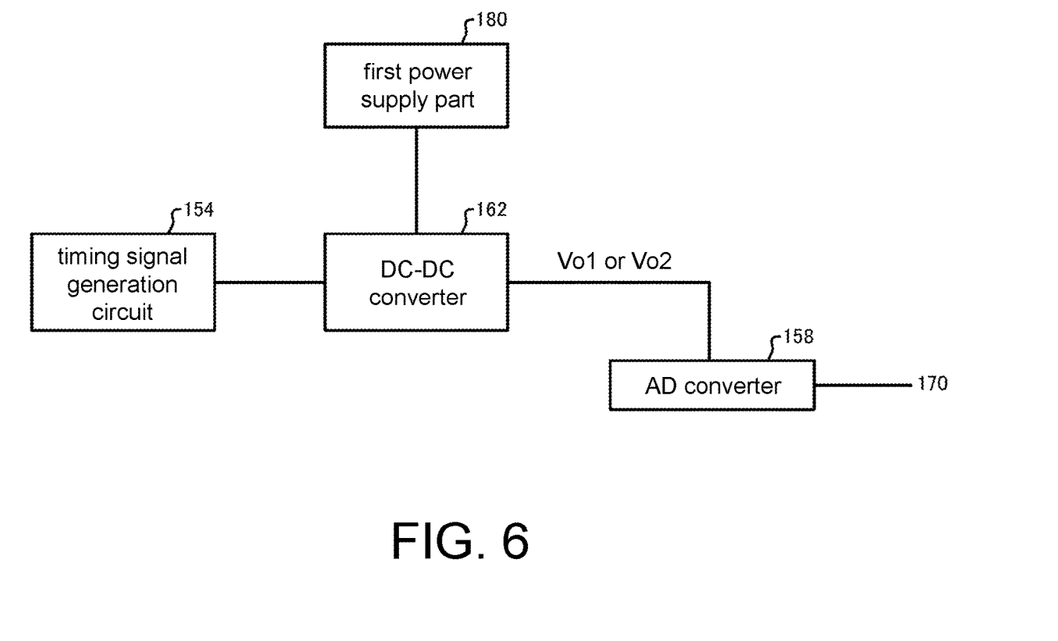
FIG. 6 is a diagram showing an example of the connection of the DC-DC converter 162 shown in FIG. 1.

FIG. 6 is a diagram showing an example of the connection of the DC-DC converter 162 shown in FIG. 1. The DC-DC converter 162 is coupled to the timing signal generation circuit 154, the AD converter 158, and the first power supply part 180. The DC-DC converter 162 converts the voltage of the first power supply part 180 into the output voltage Vo1 or Vo2 according to the timing signal and the pause signal generated by the timing signal generation circuit 154, and generates the output voltage Vo1 or Vo2 as the power supply voltage of the AD converter 158.

In the embodiment described with reference to FIG. 1 to FIG. 6, the detection part 136 and the like may use an element having a small resistance value so as to suppress power consumption of the detection part 136 and the like. In this case, the amplitude of the signal generated by the detection part 136 and the like also decreases. In order to detect such a signal with high precision with the AD converter 158, the AD converter 158 may be disposed near the detection part 136 and the like. In addition, a driving circuit including the AD converter 158 and the like is usually disposed near the motor 110. Therefore, the area of the driving circuit may be small.

According to the embodiment described with reference to FIG. 1 to FIG. 6, the DC-DC converter 162, the AD converter 158, etc. are provided in the same integrated circuit 150. Therefore, these circuits can be miniaturized and can be easily disposed near the detection part 136 and the like and the motor 110.

When the DC-DC converter 162 and the AD converter 158 are provided in the same integrated circuit 150, noise from the DC-DC converter 162 may affect the precision of the AD converter 158. According to the present embodiment, the operation of the DC-DC converter 162 is stopped when the AD converter 158 operates, so the AD converter 158 can be operated with high precision. As a result, the precision of the rotation control of the motor 110 can be improved.

Although the disclosure has been described with reference to the embodiment above, the technical scope of the disclosure is not limited to the scope described in the above embodiment. It is apparent to those skilled in the art that various changes or modifications can be added to the above embodiment. It is apparent from the scope of the claims that embodiments added with such changes or modifications are also included in the technical scope of the disclosure.

It should be noted that the execution of the processes such as operations, procedures, steps, and stages of the device, system, program, and method shown in the claims, specification, and drawings is not particularly specified as "earlier than", "before", or the like, and may be realized in any order unless the output of the previous process is used in the later process. Although "first", "next" or the like may be used to describe the operation flow in the claims, specification, and drawings for convenience, it does not mean that the operation flow has to be performed in such an order.

What is claimed is:

1. An integrated circuit, comprising:
an AD converter converting an analog signal into a digital signal;
a DC-DC converter converting a first voltage that is received into a second voltage to provide the second voltage as a power supply voltage of the AD converter; and
a control part controlling the AD converter and the DC-DC converter in a manner that the AD converter is operated in a case that a conversion operation of the DC-DC converter stops,
wherein the DC-DC converter comprises:
a first switching element;
a second switching element having one end coupled to a reference potential and the other end coupled to one end of the first switching element;
a coil coupled to a connection point of the first switching element and the second switching element; and
a current detection part detecting a current flowing to the coil,
wherein the control part sets the first switching element to an off state and sets the second switching element to an on state while the AD converter is the off state, and sets the second switching element to the off state after the current detected by the current detection part becomes equal to or smaller than a reference current value, and operates the AD converter after the second switching element is set to the off state.

2. The integrated circuit according to claim 1, wherein the DC-DC converter converts the first voltage into the second voltage by a switching operation.

3. The integrated circuit according to claim 2, wherein the DC-DC converter comprises a capacitor coupled to one end of the coil.

4. The integrated circuit according to claim 3, wherein the DC-DC converter further comprises a shunt switch coupling the connection point to the reference potential when stopping the switching operation.

5. The integrated circuit according to claim 4, wherein the DC-DC converter further comprises a shunt resistor coupled in series with the shunt switch.

6. The integrated circuit according to claim 3, wherein the DC-DC converter further comprises a loop switch coupling two ends of the coil when stopping the switching operation.

7. The integrated circuit according to claim 3, wherein the control part calculates an operation duty of the first switching element and the second switching element based on a received signal to control the first switching element and the second switching element, and
when stopping the switching operation of the DC-DC converter, the control part stops calculating the operation duty and stores a value of the operation duty.

8. The integrated circuit according to claim 2, further comprising a timing signal generation circuit generating a pause signal for stopping the switching operation of the DC-DC converter,
wherein the control part enables the DC-DC converter to perform the switching operation when the pause signal has a first polarity, and stops the switching operation of the DC-DC converter and operates the AD converter when the pause signal has a second polarity different from the first polarity.

9. The integrated circuit according to claim 1, further comprising a drive circuit supplied with the power supply voltage from the DC-DC converter and driving a motor.

10. A motor device, comprising:
the integrated circuit according to claim 1; and
the motor driven by the drive circuit.

11. The integrated circuit according to claim 1, wherein the current detection part monitors the current flowing in the coil, and
when the current flowing in the coil decreases to be equal to or smaller than the reference current value, the AD converter starts operating.

* * * * *